June 17, 1930.  L. LAUBER  1,764,876
BROOM CONSTRUCTION
Filed Feb. 4, 1928
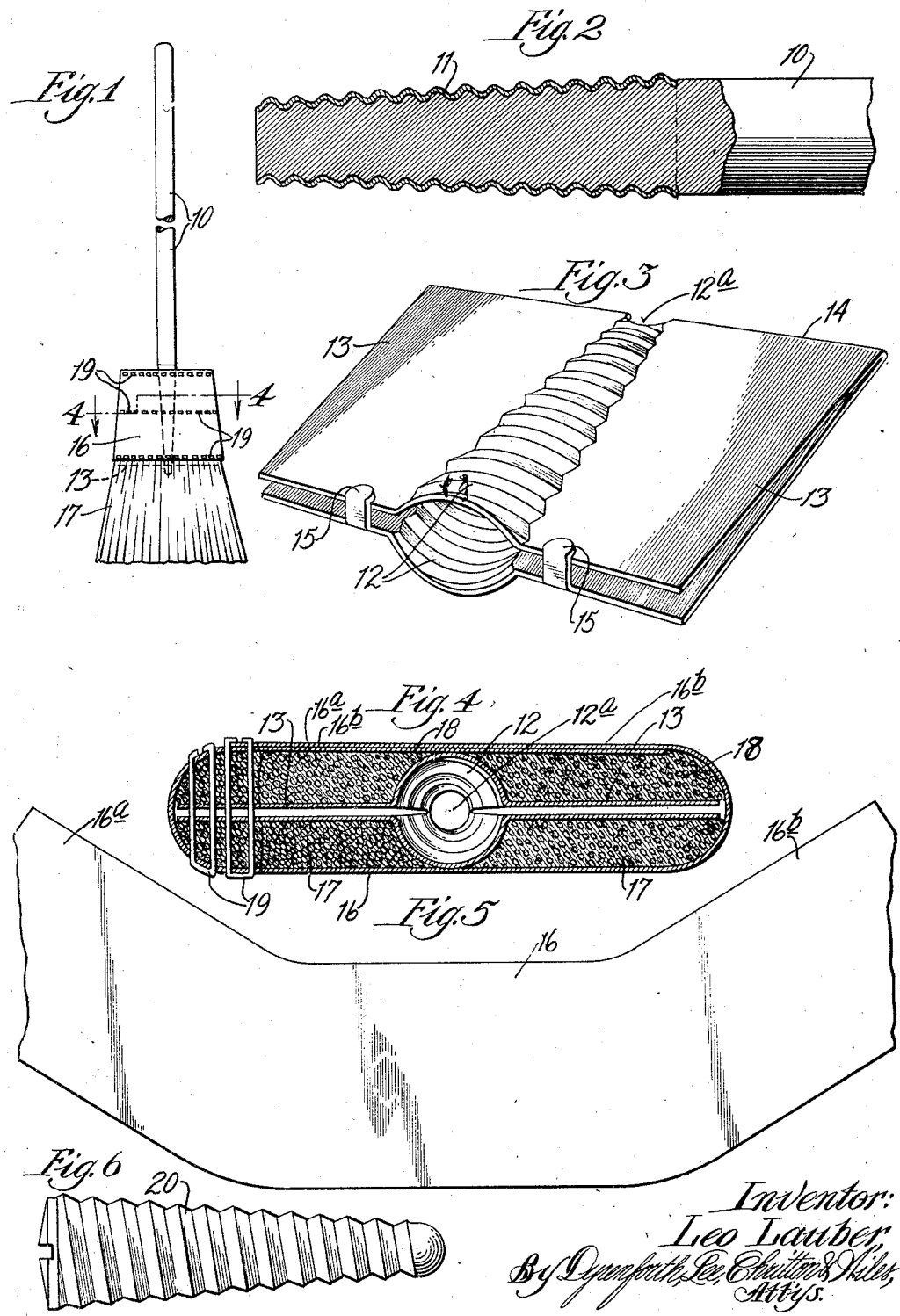
Inventor:
Leo Lauber Patented June 17, 1930

1,764,876

UNITED STATES PATENT OFFICE

LEO LAUBER, OF CHICAGO, ILLINOIS

BROOM CONSTRUCTION

Application filed February 4, 1928. Serial No. 251,853.

This invention relates to an improvement in brooms and the like and is fully described in the following specification and shown in the accompanying drawings, in which:

Figure 1 is a front elevation of a broom embodying the invention;

Fig. 2 is a partial enlarged longitudinal section of the broom handle;

Fig. 3 is a perspective view of a sheet metal member adapted to be anchored in the broom and adapted to receive the tapered end of the broom handle;

Fig. 4 is an enlarged sectional view on the broken line 4—4 of Fig. 1;

Fig. 5 is a partial developed view of the sheath for enclosing the upper portion of the broom straws; and Fig. 6 is a side elevation of a tapered screw used in making the broom.

The broom illustrated is of the type intended for heavy duty and is consequently made of a very strong and rigid construction.

An object of the invention is to provide a very strong and durable yet inexpensive construction which will permit of the handle, which has seen relatively little hard usage, being used again when the wearable part of the broom is about to be discarded. To accomplish this, I have provided a broom with a handle 10, the lower end of which is perferably tapered, the tapered portion being covered with a sheet metal tip or ferrule 11 which is provided with the tapering thread which is adapted to be screwed into a corresponding thread in the tapered portion 12 of a plate 13 which is adapted to be secured in the broom as will later be explained.

The sheet metal member 13 is preferably folded upon itself along the line 14 to form two overlapping sections which are secured together by means of overhanging ears 15 which are preferably formed integral therewith. The member 13 may be formed from sheet steel or from a heavy grade of tin, and thus provides a tapering socket 12 which is threaded to receive the tapered screw member 11 of the handle.

The member 13 is placed in the broom as shown in Fig. 4. In assembling the broom, the sheath 16 is laid out flat upon a table or the like and one-half of the broom straws which are to be used in the broom will spread out uniformly on the sheath 16 and these form the lower half 17 of the broom straws shown in Fig. 4. The sheet metal member 13 is then laid over the broom straws 17 after which the upper layer of broom straws 18 is spread out over the top of the member 13.

The ends $16^a$ and $16^b$ of the sheath 16 are then folded about the broom straws 17 and 17 as shown in Fig. 4, and the whole is secured in place by means of three or more lines of metal staples 19 or the like which pass through the broom straws and which pierce the several thicknesses of sheet metal. These are clinched on the ends to retain them in place so that the whole is then firmly secured together.

Previous to applying these staples, the broom is placed under a press and a tapered screw member 20 (Fig. 6) having substantially the shape of the tapered screw 11 is placed within the tapered screw socket 12 in order that the pressure thus exerted will not crush or flatten the screw member 12. Where wire staples as 19 are used, the anvil member 20, closely fitting the hole 12, serves to clinch the staples passing thereinto.

This tapered screw member having served its purpose is then turned so as to unscrew it from the socket 12 and the broom straws are then trimmed at their ends which substantially completes the broom.

The metal envelope or ferrule 11 may be made in any convenient form and secured to the handle 10 in any desired manner as by nailing it thereto. If desired, a wire (not shown) may be wrapped about the handle to form a screw. The tapered portion 12 terminates in an opening $12^a$ which permits the anvil 20 on the screw 11 to extend through it.

Thus it will be seen that the handle 10 may be withdrawn from the broom head by unscrewing it from the socket 12 so that when the broom has worn away to a point where it would be discarded the handle may be readily saved. Under some conditions, as where a broom is kept very dry, the broom-straws will have a tendency to dry out and become loose in the broom head. This is overcome to some extent by the tapered form of the screw threads 11 and of the tapering socket 12. The latter spreads as the broom straws dry out and shrink thereby permitting the handle to be screwed in somewhat further and thus causing the broom straws to tighten in the head as would otherwise be the case.

The handle, extending as it does well into the broom head, serves to stiffen and strengthen the latter to a great degree.

While I have shown and described one embodiment of this invention, it is to be understood that it is capable of many modifications. Changes therefore in the construction and arrangement may be made which do not depart from the spirit and scope of the invention as disclosed in the appended claims.

I claim:

1. In a broom construction, a sheet metal member bent along a median line so as to form two overlapping portions open at the upper end and having an enlarged screw threaded central portion adapted to receive a screw threaded handle, broom fibers on each side of said member, a sheath enclosing the broom fibers and member, and means for securing said parts together.

2. In a device of the character set forth, a sheet metal member bent along a median line so as to form two overlapping portions open at the upper end and having a central perforation in the lower end, a handle adapted to be received within said overlapping portions and to pass through said perforated lower end of the sheet metal member, broom fibers on each side of said member, a sheath enclosing the broom fibers and member, and means for securing said parts together.

3. In a device of the character set forth a sheet metal member having an enlarged screw threaded central portion adapted to receive a screw threaded handle, said member being bent along a median line so as to form two overlapping portions open at the upper end, ears secured to the upper side of one of said overlapping portions and adapted to engage the upper side of the other overlapping portion, a screw threaded handle, broom fibers, a sheath enclosing said broom fibers and member, and means for securing said parts together.

4. In a device of the character set forth, a sheet metal member bent along a median line so as to form two overlapping portions open at the upper end and having a central perforation in the lower end, a handle adapted to be received within said overlapping portions and to pass through said perforated lower end of said sheet metal member, fibers on each side of said member, a fan-shaped sheath enclosing the fibers and member, said sheath engaging the ends of said sheet metal member, and means for securing said parts together.

In testimony whereof I have hereunto set my hand and seal this 14th day of December, 1927.

LEO LAUBER.